US012793118B2

(12) United States Patent
Shaaban et al.

(10) Patent No.: US 12,793,118 B2
(45) Date of Patent: Nov. 10, 2026

(54) SYSTEM AND METHOD FOR FACILITATING PURCHASES

(71) Applicant: Fulcrum Global Technologies Inc., Schaumburg, IL (US)

(72) Inventors: Ahmed Farouk Shaaban, South Barrington, IL (US); Venkat Thandra, South Barrington, IL (US)

(73) Assignee: Fulcrum Global Technologies Inc.

( * ) Notice: Subject to any disclaimer, the term of this patent is extended or adjusted under 35 U.S.C. 154(b) by 0 days.

(21) Appl. No.: 18/380,524

(22) Filed: Oct. 16, 2023

(65) Prior Publication Data

US 2024/0037636 A1 Feb. 1, 2024

Related U.S. Application Data

(63) Continuation of application No. 14/756,619, filed on Jun. 29, 2015, now abandoned.

(51) Int. Cl.
*G06C 1/00* (2006.01)
*G06F 17/40* (2006.01)
(Continued)

(52) U.S. Cl.
CPC ......... *G06Q 30/0635* (2013.01); *G06F 17/40* (2013.01); *G06Q 10/06* (2013.01);
(Continued)

(58) Field of Classification Search
CPC .. G06Q 30/0635; G06Q 10/06; G06Q 20/102; G06Q 20/14; G06Q 20/18;
(Continued)

(56) References Cited

U.S. PATENT DOCUMENTS 4,876,648 A 10/1989 Lloyd
5,459,657 A 10/1995 Wynn
(Continued)

FOREIGN PATENT DOCUMENTS

AU 2012203280 A1 12/2013
CN 1397125 2/2003
(Continued)

OTHER PUBLICATIONS

Extended European Search Report issued Feb. 24, 2021 in corresponding European Application No. 21152652.0.
(Continued)

*Primary Examiner* — Kambiz Abdi
(74) *Attorney, Agent, or Firm* — Spencer Fane, LLP

(57) ABSTRACT

The present invention consists of an improved system and method for tracking expenses and billing them to a client, matter, task, activity, client group or phase and assessing goods and services purchased to these categories on a line by line basis. The system also allows an employee to place an order by selecting from a list of preapproved vendors and checking both vendor ratings and item ratings prior to purchase. Once the items are received, the bill of lading is reviewed for receipt of the proper items in the proper quantities. This information may be scanned, texted or emailed into the system to generate additional in house reviews for the system. Information on the items purchased is allocated across one or more ledgers on a line by line basis and may be entered into one or more of the following categories: Client ID, Task, Activity, Phase, Matter and Client Group.

14 Claims, 8 Drawing Sheets

(51) Int. Cl.

| | |
|---|---|
| ***G06Q 10/06*** | (2023.01) |
| ***G06Q 20/10*** | (2012.01) |
| ***G06Q 20/14*** | (2012.01) |
| ***G06Q 20/18*** | (2012.01) |
| ***G06Q 20/20*** | (2012.01) |
| ***G06Q 30/04*** | (2012.01) |
| ***G06Q 30/0601*** | (2023.01) |
| ***G06Q 40/12*** | (2023.01) |
| ***G09C 1/00*** | (2006.01) |
| ***H04L 9/32*** | (2006.01) |

(52) U.S. Cl.

CPC ........... *G06Q 20/102* (2013.01); *G06Q 20/14* (2013.01); *G06Q 20/18* (2013.01); *G06Q 20/207* (2013.01); *G06Q 30/04* (2013.01); *G06Q 40/123* (2013.12); *G09C 1/00* (2013.01); *H04L 9/3226* (2013.01); *H04L 9/3234* (2013.01)

(58) Field of Classification Search

CPC .... G06Q 20/207; G06Q 30/04; G06Q 40/123; G06Q 10/0875; G06Q 40/12; G06F 17/40; G09C 1/00; H04L 9/3226; H04L 9/3234

See application file for complete search history.

(56) References Cited

U.S. PATENT DOCUMENTS 5,493,492 A 2/1996 Cramer
5,943,655 A 8/1999 Jacobson
5,970,475 A * 10/1999 Barnes ............... G06Q 30/0641 705/26.81
5,991,742 A 11/1999 Tran
6,038,547 A 3/2000 Casto
6,052,671 A 4/2000 Crooks
6,115,690 A 9/2000 Wong
6,145,011 A 11/2000 Furukawa
6,185,514 B1 2/2001 Skinner et al.
6,208,974 B1 3/2001 Campbell
6,249,770 B1 6/2001 Erwin
6,401,079 B1 6/2002 Kahn
6,600,919 B1 7/2003 Kawase
6,622,128 B1 9/2003 Bedell
6,625,267 B1 9/2003 Graham
6,735,574 B2 5/2004 Bull
6,747,679 B1 6/2004 Finch, II et al.
6,804,337 B1 10/2004 Anderson
6,832,176 B2 12/2004 Hartigan et al.
7,218,980 B1 5/2007 Orshansky
7,269,584 B2 9/2007 Settle, III
7,343,316 B2 3/2008 Goto et al.
7,379,912 B1 5/2008 Camin
7,495,689 B2 2/2009 Curtis
7,640,209 B1 12/2009 Brooks
7,664,638 B2 2/2010 Cooper
7,810,713 B2 10/2010 Lal
7,921,048 B2 4/2011 Sloan
7,958,023 B1 6/2011 Shibayama
8,055,556 B2 11/2011 Taylor
8,126,798 B1 2/2012 Dolan
8,185,514 B1 5/2012 Skrenta
8,190,504 B1 5/2012 Stolz
8,204,809 B1 6/2012 Wise
8,209,243 B2 6/2012 Smith et al.
8,229,810 B2 7/2012 Butera
8,255,991 B1 8/2012 Hackborn
8,391,835 B1 3/2013 Lubart
8,510,198 B2 8/2013 Kmak
8,510,392 B2 8/2013 Ordille
8,554,603 B1 10/2013 Paulmann
8,566,243 B1 10/2013 Bharathula
8,589,821 B1 11/2013 Bouchard
8,671,143 B2 3/2014 Lewis
8,744,934 B1 6/2014 Mccrea
8,768,809 B1 7/2014 Cole
8,838,486 B2 9/2014 Kong et al.
9,020,848 B1 4/2015 Ridge et al.
9,229,810 B2 1/2016 He
9,830,623 B2 11/2017 Mccrea
2001/0034677 A1 10/2001 Farhat
2001/0042032 A1 11/2001 Crawshaw et al.
2001/0051918 A1 12/2001 Mason
2002/0010661 A1* 1/2002 Waddington ......... G06Q 10/087 705/28
2002/0019808 A1 2/2002 Sharma
2002/0055875 A1 5/2002 Schulze
2002/0069167 A1 6/2002 Conlow
2002/0107792 A1 8/2002 Anderson
2002/0133545 A1 9/2002 Fano
2002/0138414 A1 9/2002 Pitman
2002/0165749 A1 11/2002 Northcutt
2002/0174006 A1 11/2002 Rugge
2002/0174031 A1 11/2002 Weiss
2002/0198892 A1* 12/2002 Rychel .................. G06Q 30/02 707/999.102
2003/0018548 A1 1/2003 Cattaneo
2003/0023550 A1 1/2003 Lee
2003/0023580 A1 1/2003 Braud
2003/0033167 A1 2/2003 Arroyo
2003/0061132 A1 3/2003 Yu
2003/0097277 A1 5/2003 Miller
2003/0101112 A1* 5/2003 Gallagher ........... G06Q 20/207 705/31
2003/0115072 A1 6/2003 Manucha
2003/0120538 A1 6/2003 Boerke et al.
2003/0120577 A1 6/2003 Sakui
2003/0154122 A1 8/2003 Jackson, Jr. et al.
2003/0177052 A1 9/2003 Smith
2003/0210610 A1 11/2003 Yamagishi
2003/0220891 A1 11/2003 Fish
2003/0236751 A1 12/2003 Settle
2004/0019542 A1 1/2004 Fuchs
2004/0019561 A1 1/2004 Isturiz
2004/0035922 A1 2/2004 Cameron
2004/0064351 A1 4/2004 Mikurak
2004/0073477 A1 4/2004 Heyns
2004/0103040 A1 5/2004 Ronaghi
2004/0149823 A1* 8/2004 Aptekar ............. G06Q 10/0875 235/385
2004/0181591 A1 9/2004 Yu
2004/0230525 A1 11/2004 Barsade
2004/0250208 A1 12/2004 Nelms
2005/0033609 A1 2/2005 Yang
2005/0119922 A1 6/2005 Eder
2005/0177476 A1 8/2005 McCandless
2005/0187839 A1 8/2005 Butera
2005/0203814 A1 9/2005 Derry
2005/0283405 A1* 12/2005 Mallo ................ G06Q 30/0631 705/7.32
2006/0015420 A1 1/2006 Lundberg
2006/0036502 A1 2/2006 Farrell
2006/0106688 A1 5/2006 Greenaae
2006/0129446 A1 6/2006 Ruhl et al.
2006/0149569 A1 7/2006 Lal
2006/0167772 A1 7/2006 Zilberman
2006/0184522 A1 8/2006 McFarland
2006/0271463 A1 11/2006 Young
2006/0287966 A1 12/2006 Srinivasaraghavan
2006/0294004 A1 12/2006 Burge
2006/0294235 A1 12/2006 Joseph
2007/0027787 A1 2/2007 Tripp
2007/0043645 A1 2/2007 Wiehler
2007/0050710 A1 3/2007 Redekop
2007/0055592 A1 3/2007 Vu
2007/0061260 A1 3/2007 DeGroeve
2007/0067206 A1 3/2007 Haggerty
2007/0088563 A1 4/2007 Nardotti
2007/0094110 A1 4/2007 McCrea
2007/0100714 A1 5/2007 Walker
2007/0143398 A1 6/2007 Graham
2007/0162369 A1 7/2007 Hardison, III

(56) References Cited

U.S. PATENT DOCUMENTS

2007/0174163 A1 7/2007 Griffin
2007/0214068 A1 9/2007 Tadepalli
2007/0244777 A1 10/2007 Torre
2007/0271178 A1 11/2007 Davis
2007/0276683 A1 11/2007 Hollis
2008/0033851 A1 2/2008 Williams
2008/0085752 A1 4/2008 Okada
2008/0114807 A1 5/2008 Sembower
2008/0133287 A1 6/2008 Slattery
2008/0215474 A1 9/2008 Graham
2009/0006228 A1 1/2009 Hodgin
2009/0012886 A1 1/2009 Allin
2009/0037247 A1 2/2009 Quinn
2009/0043637 A1 2/2009 Eder
2009/0089193 A1 4/2009 Paintin
2009/0094112 A1 4/2009 Cesarini
2009/0106132 A1 4/2009 Isturiz
2009/0119062 A1 5/2009 Owens
2009/0144082 A1 6/2009 Selbst
2009/0164231 A1 6/2009 Fox
2009/0181642 A1 7/2009 Bekanich
2009/0182567 A1 7/2009 Stine
2009/0216726 A1 8/2009 Muthaiah
2009/0222366 A1 9/2009 Cao
2009/0232289 A1 9/2009 Drucker
2010/0017316 A1 1/2010 Joseph
2010/0030610 A1 2/2010 Gomeh
2010/0070406 A1 3/2010 Stein
2010/0106580 A1 4/2010 Etheredge
2010/0106738 A1 4/2010 Anderson
2010/0179884 A1 7/2010 Glaser
2010/0235306 A1 9/2010 Wagoner
2010/0293091 A1 11/2010 Kurczodyna
2010/0306095 A1 12/2010 Olson
2010/0312606 A1 12/2010 Gala
2010/0332309 A1 12/2010 Mason
2011/0046985 A1 2/2011 Raheman
2011/0054968 A1 3/2011 Galaviz
2011/0093792 A1 4/2011 Frayman
2011/0106691 A1 5/2011 Clark
2011/0112891 A1 5/2011 Alber
2011/0119178 A1 5/2011 Clayton
2011/0145278 A1 6/2011 Maes
2011/0161250 A1 6/2011 Koeppel
2011/0178934 A1 7/2011 Imrey
2011/0184935 A1 7/2011 Marlin
2011/0208627 A1 8/2011 Shibayama
2011/0213685 A1 9/2011 Flynn
2011/0238853 A1 9/2011 Paul
2011/0270779 A1 11/2011 Showalter
2012/0035980 A1 2/2012 Haggerty et al.
2012/0036063 A1 2/2012 Sivapathasundram
2012/0109792 A1 5/2012 Eftekhari
2012/0166332 A1 6/2012 Naaman
2012/0173297 A1 7/2012 Styn et al.
2012/0191817 A1 7/2012 Sayan
2012/0215578 A1 8/2012 Swierz, III
2012/0233044 A1 9/2012 Burger et al.
2012/0239417 A1 9/2012 Pourfallah
2012/0278211 A1 11/2012 Loveland et al.
2012/0303403 A1 11/2012 Lee
2013/0000968 A1 1/2013 Zhao
2013/0006845 A1 1/2013 Kremen
2013/0024340 A1 1/2013 Co
2013/0085939 A1 4/2013 Colak
2013/0086062 A1 4/2013 Coyne
2013/0090968 A1 4/2013 Borza
2013/0110599 A1 5/2013 Gonzales
2013/0117167 A1 5/2013 Iyer
2013/0144649 A1 6/2013 Kalies, Jr.
2013/0159203 A1 6/2013 Munzer
2013/0179315 A1 7/2013 Feliciano Lopez
2013/0204751 A1* 8/2013 Sharma ................ G06Q 10/087 705/28
2013/0204758 A1 8/2013 Lee
2013/0268323 A1 10/2013 Foster
2013/0290154 A1 10/2013 Cherry et al.
2013/0339219 A1 12/2013 Bernheimer
2014/0019348 A1 1/2014 Daley
2014/0032444 A1 1/2014 Dunne
2014/0046872 A1 2/2014 Arnott
2014/0095539 A1 4/2014 Smit et al.
2014/0096539 A1 4/2014 Gustafson
2014/0108644 A1 4/2014 Zaents et al.
2014/0129366 A1 5/2014 Mudhar
2014/0129400 A1 5/2014 Armstrong et al.
2014/0143126 A1 5/2014 Malik
2014/0156460 A1 6/2014 Fan et al.
2014/0156508 A1 6/2014 Argue
2014/0172679 A1 6/2014 Shimko
2014/0172704 A1 6/2014 Atagun
2014/0201136 A1 7/2014 Smid
2014/0201138 A1 7/2014 Dorman et al.
2014/0258057 A1 9/2014 Chen et al.
2014/0268243 A1 9/2014 Mitsubori
2014/0279318 A1 9/2014 Friedman
2014/0279692 A1 9/2014 Boothby
2014/0280905 A1 9/2014 Bryan
2014/0330620 A1 11/2014 Abella
2014/0344122 A1 11/2014 Hodgin
2014/0358723 A1 12/2014 Ballaro
2015/0081381 A1 3/2015 Okoba
2015/0081487 A1 3/2015 Porter et al.
2015/0088591 A1 3/2015 Blomberg
2015/0142621 A1 5/2015 Gray et al.
2015/0178827 A1 6/2015 Qiu
2015/0242781 A1 8/2015 Mancuso
2015/0302532 A1 10/2015 Greene
2015/0321427 A1 11/2015 Gunnarsson
2015/0339691 A1 11/2015 Davis
2015/0348067 A1 12/2015 Deegan
2016/0027126 A1 1/2016 Blowers
2016/0034987 A1 2/2016 Shaaban
2016/0203530 A1 7/2016 Shaaban
2016/0217428 A1 7/2016 Shaaban
2017/0161802 A9 6/2017 Hughes
2018/0300326 A1 10/2018 Troy
2019/0147366 A1 5/2019 Sankaran
2019/0286462 A1 9/2019 Bodnick
2020/0219163 A1 7/2020 Kumar
2020/0380624 A1 12/2020 Turgman
2021/0256580 A1 8/2021 Norman
2021/0318137 A1 10/2021 Nallu
2023/0005228 A1 1/2023 Parfenov
2023/0012408 A1 1/2023 Shaaban
2023/0154240 A1 5/2023 Browne
2023/0206350 A1 6/2023 Ronen
2023/0325381 A1 10/2023 Rogynskyy
2023/0388742 A1 11/2023 Turpin
2023/0401254 A1 12/2023 Lebecque

FOREIGN PATENT DOCUMENTS

CN 1568474 1/2005
CN 1577366 A 2/2005
CN 1778067 A 5/2006
CN 101042699 9/2007
CN 101241577 8/2008
CN 101251913 8/2008
CN 101296360 10/2008
CN 101316304 12/2008
CN 101339564 1/2009
CN 101404671 A 4/2009
CN 101471897 7/2009
CN 101539943 9/2009
CN 101616300 12/2009
CN 101667266 3/2010
CN 101668276 3/2010
CN 101727618 A 6/2010
CN 101742019 6/2010
CN 102034136 A 4/2011
CN 102324074 1/2012
CN 102946554 2/2013
CN 103324425 9/2013

(56) References Cited

FOREIGN PATENT DOCUMENTS

| | | | |
|---|---|---|---|
| EP | 1145162 | A2 | 7/2000 |
| EP | 1769452 | A2 | 2/2006 |
| EP | 2026222 | A1 | 2/2009 |
| EP | 2338293 | A2 | 4/2010 |
| JP | 2008250742 | | 10/2008 |
| JP | 7475017 | B1 | 4/2024 |
| KR | 20110097731 | A | 8/2011 |
| WO | 1999013422 | | 3/1999 |
| WO | 2008061146 | A2 | 5/2008 |
| WO | 2008081146 | | 7/2008 |
| WO | 2009097625 | A1 | 8/2009 |
| WO | 2010011652 | A1 | 1/2010 |
| WO | 2013088397 | | 6/2013 |
| WO | 2014016796 | A1 | 1/2014 |
| WO | 2014028340 | | 2/2014 |
| WO | 2015029073 | A2 | 3/2015 |
| WO | 2015079776 | A1 | 4/2015 |

OTHER PUBLICATIONS

Examination Report No. 1 issued Apr. 6, 2020 in corresponding Australian Application No. 2015284134.
Search Report issued Aug. 14, 2020 in corresponding Brazilian Application No. BR112016031016-0.
Decision of Rejection issued Nov. 24, 2021 in corresponding Chinese Application No. 201580046321 .8.
Third Office Action issued Jun. 3, 2021 in corresponding Chinese Application No. 201580046321.8.
Preliminary Report issued Jan. 3, 2017 in corresponding International Application No. PCT/US2015/038709.
Supplementary Search Report issued Oct. 26, 2017 in corresponding European Application No. 15815178.
Office Action issued Oct. 1, 2018 in corresponding European Application No. 15815178.7.
Office Action issued Jun. 19, 2020 in corresponding European Application No. 15815178.7.
Office Action issued Feb. 5, 2021 in corresponding European Application No. 15815178.7.
Ovans, Andrea. E-Procurement at Schlumberger. Published in Harvard Business Review Magazine May-Jun. 2000. (Year: 2000).
“Bidirectional Linkig of 2 Cells”, BombCenter, 2012, available at https://www.mrexcel.com/board/threads/bi-directional-linking-of-2- cells.628507/ (Year: 2012).
“TimeManager User Guide”, Atlantic Associates, (Nov. 9, 2011), pp. 1-195, URL: https://d335hnnegk3szv.cloudfront.net/wp-content/uploads/sites/1101/2013/01/TimeMgrManual.pdf, (Feb. 17, 2016), XP055250863.
“Working With Multicurrency Customers in QuickBooks Online”, 2008, http://qbpowerhour.com/working-with-multicurrency-customers-in-quickbooks-online/ (Year: 2008).
“Sage Timeslips User’s Guide”, 2012 (Year: 2012).
A Decision of Rejection in the corresponding Chinese Patent Application No. 201580046270.9, dated May 26, 2021.
A First Office Action in the corresponding Chinese Patent Application No. 201580046270.9, dated Mar. 27, 2020.
A First Office Action of Rejection in the corresponding Chinese Patent Application No. 201580046279.X, dated Mar. 20, 2020.
A Preliminary Report in the corresponding PCT Patent Application No. PCT/US2015/038706, dated Oct. 14, 2015.
A Search Report and Written Opinion in the corresponding Brazilian Patent Application No. BR112016031021-7, dated Dec. 1, 2020.
A Search Report in the corresponding European Patent Application No. 15814628.2, dated Aug. 11, 2017.
A second Office Action in the corresponding Chinese Patent Application No. 201580046270.9, dated Dec. 2, 2020.
A Second Office Action in the corresponding Chinese Patent Application No. 201580046279.X, dated Dec. 1, 2020.
An Annex to the communication in the corresponding European Patent Application No. 15814628.2, dated Apr. 5, 2019.
An Examination Report No. 1 in the corresponding Australian Patent Application No. 2015284131, dated Mar. 12, 2020.
Bill4time, 2013, available at https://web.archive.org/web/20140327100218/https://www.bill4time.com/manuals/bill4time-administration-guide.pdf (Year: 2014).
Chinese Office Action and Search Report issued Jan. 6, 2020 in corresponding Chinese Patent Application No. 201580046238.0 (with English Translation).
Chinese Office Action issued Aug. 26, 2021 in corresponding Chinese Patent Application No. 201580046238.0 (with English Translation).
Chinese Office Action issued Mar. 3, 2021 in corresponding Chinese Patent Application No. 201580046238.0 (with English Translation).
Decision of Rejection in the corresponding Chinese Patent Application No. 201580046238.0, dated Nov. 25, 2021.
Dunning Letters as to Time-Barred Debt Can Violate Fair Debt Collection Practices Act (FDCPA) Friday, Mar. 28, 2014; 2 pages; www.natlawreview.com/article/dunning-letters-to-time-barred-debt-can-violate-fair-debt-collection-practices-act-f.
European Office Action issued Jan. 26, 2023 in corresponding European Application No. 20213318.7.
European Search Report issued Mar. 17, 2022 in corresponding European Application No. 21210232.1.
Examination Report issued Apr. 5, 2022 in corresponding Australian Application No. 2021201312.
Introduction to Sage Timeslips, Sep. 2021.
Rasheed, “Avaza Releases More Flexible Invoice Templates”, Mar. 2017, available at https://www.avaza.com/avaza-releases-more-flexible-invoice-templates/ (Year: 2017).
Wang et al., “Training Course of Enterprise Resource Planning (ERP)”; China Railway Publishing House; Dec. 31, 2011’pp. 178-184.
WK, CCH, Getting Started with ProSystem fx Practice Management Getting Started Guide, May 2014, pp. 1-165 (Year: 2).
Written Opinion issued Oct. 4, 2022 in corresponding Brazilian Application No. BR 11 2016 031013-6.
Office Action (Final Rejection) dated Feb. 27, 2025 for U.S. Appl. No. 18/380,521 (pp. 1-14).
Office Action (Final Rejection) dated May 14, 2025 for U.S. Appl. No. 18/741,579 (pp. 1-24).
Office Action (Final Rejection) dated Jun. 4, 2025 for U.S. Appl. No. 18/385,156 (pp. 1-18).
Office Action (Non-Final Rejection) dated Feb. 20, 2025 for U.S. Appl. No. 16/426,098 (pp. 1-11).
Office Action (Non-Final Rejection) dated Feb. 27, 2025 for U.S. Appl. No. 18/385,156 (pp. 1-14).
Office Action (Non-Final Rejection) dated Mar. 31, 2025 for U.S. Appl. No. 14/756,741 (pp. 1-21).
International Search Report and Written Opinion issued in PCT/US2025/027825, dated Oct. 8, 2025 (pp. 1-8).
International Search Report and Written Opinion issued in PCT/US2025/041328, dated Oct. 21, 2025 (pp. 1-14).
International Search Report and Written Opinion issued in PCT/US2025/041339, dated Oct. 28, 2025 (pp. 1-23).
International Search Report and Written Opinion issued in PCT/US2025/041344, dated Oct. 30, 2025 (pp. 1-10).
International Search Report and Written Opinion issued in PCT/US2025/041356, dated Oct. 20, 2025 (pp. 1-10).

* cited by examiner

SYSTEM AND METHOD FOR FACILITATING PURCHASES

PRIORITY CLAIM

The present application is a continuation of U.S. patent application Ser. No. 14/756,619, entitled "Improved System and Method for Management of Professionals", filed Jun. 29, 2015, which claims priority to U.S. Provisional Application No. 61/998,557, filed Jun. 30, 2014, entitled "Professional Service Firm Management Method, the entire contents of each of which is hereby incorporated by reference and relied upon.

FIELD OF THE INVENTION

The present invention relates to the automation of billing and time keeping, and more particularly, tracking and billing orders and expenditures by vendors and posting journal entries to ledgers and subledgers.

BACKGROUND OF THE INVENTION

In the current marketplace, there are a variety of computerized time and billing systems for professional firms which are marketed under the following Trademarks: Timeslips by Sage, BillQuick, Clio and others. Some of these systems are computer based while others operate primarily in a cloud computing environment. These systems, however, are not suited to large law firms and professional firms having a global presence, with multiple offices in a plurality of countries which must be linked together for proper billing and financial management. In addition, these are basic programs which do not contain the most up to date features such as transmissions by text, email, fax, computer voice calling, and social media announcements and billing. Other numerous and varied disclosures related to billing and timekeeping are also disclosed in the prior art as shown below.

EP 1,145,162 issued to Ashby discloses the use of a System for processing credit applications, financial and insurance services and administrative and management tools. The System will generate a price quote for insurance and finance and facilitate on line credit application processing. It will further provide detailed reports for finance, insurance inventory, tracking and other administrative matters. It will provide quick quotes for a lease or loan. It will also perform: inventory tracking, insurance tracking, purchase tracking, applicant profiling, targeted marketing, customer satisfaction, etc. The system will collect data for credit, a description of the item being sold, insurance will be offered for the item, licensing and data required for the government will be collected.

Ashby also discloses that the User can be a financial institution, a dealer, manufacturer, insurer or supplier. It can utilize and store credit agreements with customer ratings and interest rates which can be bundled and sold on a public exchange. FAQ's can be provided in the system, and it can provide Quick Quotes on the spot to the consumer. However, this disclosure is directed to car sales and insurance, not timekeeping. The terms it stores are contract terms, contract ID, customer ID, buy rate, the sales rate, dealer markup, payments, cash down, trade in value, lease fee, monthly payments, commission and taxes due. However, Ashby does not relate to professional timekeeping or billing.

EP Patent No. 1,769,452 issued to Allin discloses the use of a computerized system for residential and commercial construction projects to maintain and disburse construction draws during construction. It can track lien waivers, and can prepare, approve, sign and distribute hundreds of checks to subcontractors each month. It also tracks construction change orders. It can manage all of the persons involved in each draw. It manages and generates a construction budget and time line. It also manages payments to material suppliers. It can manage and store the inspection data for each project. It can manage budgets for GC's as well as the subs. It handles ACH payments. Template forms are utilized to facilitate the draw process. Notices can be sent by email, text or voice.

EP Patent No. 2,026,222 issued to Alquier discloses the use of a system and method which allows the addition, modification and deletion of data base fields dynamically without the use of a data base administrator. The system allows the addition and modification of an informational structure dynamically distributed directly via the user interface. It supports different types of entity attributes including, text, numerical information, date ad time, predefined values and binary objects, allows the creation of relational dependancies between information entities (e.g., patent/child), provides flexible reporting capabilities including spreadsheets, slides, documents, timelines, etc.; it allows a configurable data entry interface; it allows importation of data from external sources; it allows full text searches; logs modifications for an audit trial (important for pharma and med devices); includes email notifications. It allows for a user interface that is flexible and configurable. The system uses template items, coding and tables to accomplish these purposes. However, it is not directed toward time tracking and billing generation.

U.S. Patent Disclosure No. 2003/0120538 filed by Boerke, et al. discloses the use of a method for tracking progress on a task by dividing the period of time into a plurality of timeslots and determining a target number of subtasks to be completed during each timeslot. For example, the time slots may be divided into 15 minute increments. The system only tracks the number of subtasks completed for each timeslot. The method also keeps track statistically of variances in subtasks completed between workers. The task may include any type of work. The process may be used for planning purposes, i.e., as a planning tool such that management can plan and process daily or monthly work shifts according to the work to be done for particular tasks and subtasks. This helps a supervisor spot and correct negative variances in worker performance. The progress can be logged into a computer or worksheet or in paper format. Problems are also noted by the method for correction to improve performance by variance cards.

U.S. Patent Disclosure No. 2013/00090968 filed by Borza, discloses the use of an employee management and scheduling method which is directed to ensure that adequate personnel are present as required and that statutory requirements are met and costs are tracked and minimized. The Borza disclosure is also directed at apps for management cell phone usage wherein managers can track employees, their shifts and their skills and managing same. This allows for real time changes by employees that are sick or have not shown up for work. The locations may also be tracked. Scheduling software is used to manage multiple employees at multiple locations. From one screen, a manager may create, edit and delete shifts and also have access to other aspects of managing the organization staffings with information about positions, teams, skills, etc. being provided. The System can print Shift Assignment Reports and Employee Reports. However, this disclosure is directed toward scheduling employees and not tracking their time or billing for their time.

U.S. Patent Disclosure No. 2012/0233044 filed by Burger, et al., discloses the use of a Method and System for labor project management and costing which may run on a cell phone app to monitor employee activity, identify faulty activity and manage allocation of labor resources. The app, as installed on an employee cellphone, allows the employee to travel to various job locations and record the activities at each job location. The employee may log into or out of the timeclock app installed on the employee's cellphone. The system can be used to monitor managers and administrators as well as employees. The system can be used to transmit payroll information. A flag may be generated if the worker travels outside the permissible areas allocated to his role. The system stores employee photos. Job locations, routes, job codes, SIC codes, etc. may be entered into the back end by an administrator. The system also generates reports, and has a "Dashboard" or summary report simply show who is on the jobe, what time they arrived and GPS confirmation of location. The LPM platform may also be operated in the Cloud.

U.S. Patent Disclosure No. 2014/0258057 filed by Chen discloses the use of a system and method for tracking the User's time of a mobile device for the purpose of billing clients. The system is provided with a digital timer which is launched at the time of arrival and then stopped when the employee leaves. The system is directed at tracking time on a mobile device or app. It tracks time sending texts and emails. Time is recorded as soon as the professional receives a voice mail, phone call, text or email. The user can also input notes with the system's time recording and entry. The app automatically looks up in the user's contacts list whether the call or email or text coming in is from a client, and if so, it begins to track it for billing purposes. If not in the contacts registry, the user is alerted at the time and can add the contact as a client to be billed.

U.S. Patent Disclosure No. 2013/0290154 filed by Cherry, et al. discloses the use of the system and method to manage employees at a plurality of jobsites by providing a database wherein a set of job site data is stored therein. Employee devices may collect a set of time punch data and photos to store in the system. Management apps are used on supervisory devices to monitor the job site data and employees and validate photos and activate employee apps. This system is shown operating on a Cloud environment. The app will operate with a web browser, WiFi or on GPS authentication. The system essentially operates as a time tracking system for job sites. The system stores time photos of the employees at check in and check out. The system also records a job number, a job phase and a cost code. The system also has a payroll calculator communicating with a payroll service.

U.S. Patent Disclosure No. 2001/0042032 filed by Chrawshaw discloses the use of a system for capturing, processing and reporting time and expense data which can include flat fee billing, maximum fee billing and will also allow for discounts and write offs. It can be used for a wide range of businesses. A client will not have access to internal data of the company. The system will produce bills, expense reports, time sheets, proposals and project tracking. This appears to be a conventional program for law firm data which is run on a local server for one location. The system may produce various reports as needed. Bills may be delivered by email. The program will create envelopes for the bills. The system will also create budgets for the client.

U.S. Pat. No. 6,038,547 issued to Casto discloses the use of a construction tracking and payment system for use by contractors and subcontractors so that work may be tracked and payment may be timely made after the work is completed and inspections performed. The system complies with AIA requirements. The system may be implemented on a handheld computer. The system will break down a construction job into various elements, and then a contractor or subcontractor will be given a coy of how the site is partitioned, then each contractor or sub is responsible for submitting applications using the partitioning to ensure uniformity the architect desires to impose. The system can import and use CAD information on the job site. The system uses coding approved by the AIA.

U.S. Pat. No. 6,747,679 issued to Finch, II, et al. discloses the use of a time keeping and expense tracking server including a server that implements computer instructions that define logic for building GUI screens according to user instructions. The user can implement and design the screens needed for the tasks of time keeping and expense tracking. The system may be implemented on the Cloud or Internet with a laptop or wireless device desired. The GUI screen may be customized on a company by company basis, a department by department basis, etc. The system also includes security wherein projects and project codes are only viewable by certain level employees.

U.S. Pat. No. 7,343,316 issued to Goto, et al. discloses the use of a network based shift scheduling system for generating temporary shift workers. It is sent over portable terminals over a network. The system is set to secure and provide work for a plurality of workers. Workers can also submit cancellations or shift changes via the system. The system also accommodates email for communication purposes. The system may also recruit new employees. The system stores the name, age, sex address, mail address and qualifications of the employee, the workable time slots, the type of job, hourly wage, etc.

WPO 2014/016796 filed by Gupta, et al. discloses the use of a system and method for employee tracking in a mobile communication device wherein dynamic location reports may be generated in real time or near real time. The system is directed to door to door delivery or pickup sales forces. The System uses a mobile app on the employees cellphone to conduct the tracking of the employee. The system will raise flags if deviations from tracking occur. The system uses Blue Dophil software to analyze where employees should be performing tasks and produces flags when parameters gathered fall outside permissible ranges. These flags are sent to management via text or email.

U.S. Pat. No. 6,832,176 issued to Hartigan, et al. discloses the use of a method and system for tracking and reporting time spent on tasks in different application on the end users' computers while the tasks are being performed. It may track the opening and closing of files automatically and send reports and messages directly to and from other applications. The software may also suggest categories for each task based upon at least one criteria. The system may use MS Outlook for assistance in tracking tasks and transmitting reports. It is directed toward attorneys and accountants. The system may track fixed fees and use data collected for evaluating production or sweat equity bonuses to employees. The system may track a plurality of projects or research endeavors. It can track the time spent by accountants on spreadsheets. It can track the time engineers spend on designing computer code or simulating circuit designs, etc. It mentions the use of Timeslips for professional time tracking and TABS II for tracking other professional time spent on tasks and projects. The system tracks time on computers used by the professionals involved. The system presents toolbars to assist in tracking time. The system will track time spent in applications such as MS Word, Excel, Outlook, Power Point, etc. It will track when the application is open, active and then closed. It can score and rate the usage of these various types of software automatically. Various reports may be generated by the system for management usage on a periodic basis, as desired.

WPO Patent Disclosure No. 2015/079776 to Hishiki discloses the use of a work state management system that manages clock in times for drivers of vehicles that work overnight shifts and calculates the appropriate breaks for the driver so that the driver is not over tired.

U.S. Patent Disclosure No. 2014/0344,122 filed by Hodgin, discloses the use for billing for time spent in an IM session by a service person wherein the system can automatically bill a project/client by searching for the name of the client or project within a text or instant message or a series or session of same. If the system cannot find the name of a client or project, then the user will associate the IM session with a new project or client so that the client may be billed for the IM session with the client. Or the System may default into a common template for the User's typical instant messaging sessions.

U.S. Patent Disclosure No. 2009/0006228 filed by Hodgin discloses the use of a time tracking system and method similar to the IM system noted above by Hodgin. The Hodgin system will also store a list of prior associations to Projects and Clients that are built on the same or similar words and phrases.

U.S. Patent Disclosure No. 2002/0154122 filed by Jackson, Jr. discloses the use o an improved system for employers, referral agencies, consultants and independent contractors to hire and manage employees and provide tax reports and wage reports. The Jackson, Jr. System may track and manage employees, salaries and experience to provide optimal benefits to the employer. The System produces computerized scheduling, billing, record keeping and payment templates. It provides a listing of invoices for the User to refer to. It consists of providing invoices for contractor services and performs its functions in a cloud based system.

U.S. Pat. No. 8,838,486 issued to Kong, et al., discloses the use of a time manager interface on a communications display device which allows a worker to keep track of her or his time and activities. The time manager keeps track of time spent logging into and out of the system. This was important in years past when boot time were quite long. It discloses the use of scanning in employee badges to track work time. This disclosure is directed toward a system for checking work in and work out time. In one version of an embodiment, the System is located in the field. It discloses the use of GPS in the field to create an audit trail of time worked. Biometric information may be used for the system to identify the worker. It can be used nationwide for multiple local offices. It may be coupled to communicate with employee hand held devices. It can work over WiFi and cellular networks. It can store: DOB, SSN and other employee details. It can be used with a barcode or QRT code. It can be used in connection with microphones, cameras and scanners. For remote sites, the system can check the IP address of the computer or hand held device to ensure security in the system. The system can also be used to check work schedules to lock an employee out of the system when not scheduled. When an employee arrives at a worksite, upon verification, one or more emails or text messages may be sent to management for that site. Employees may view the work schedules of other employees if granted permission to do so. In doing so, employees can request work dates and exchange them with others. The system can differentiate between exempt and non exempt employees. The system can display messages to employees during time in and time out registration.

U.S. Patent Disclosure No. 2012/0278211 filed by Loveland discloses a system for remotely tracking and monitoring Worker's activities via mobile phones or other mobile tracking devices. This system monitors continuously whether or not a worker is present at a worksite.

WPO 2010/11652 filed by Manser discloses a System and Method for tracking employee performance. The Manser system provides a user interface to allow the user to assess the balance of hard skills and soft skills of an employee, evaluate the employee's performance in a plurality of categories and compare the average cost for the job in the marketplace to the cost of the employee being evaluated. The system also analyzes the average cost of a similar job in the relevant marketplace during employee reviews. The program continually monitors the value of an employee to the employer to determine ROI at any given time. The system can be applied to direct hires, contractors, temps or any employee relationship. The system allows the identification of both over achievers and under achievers. The system provides a means by which employees may determine how to get the highest ratings via their work efforts.

EP 2338293 filed by Molotsi discloses a system for time tracking for employers on a mobile computing device. The system involves providing an event manager on a mobile computing device for managing a plurality of events which are then synchronized to a server. The system will automatically track time and estimate time spent on a task by the worker. This system logs events in the user's calendar, in emails and texts. Timestamps for events and mapping for the events are provided. A client list and data may be provided in one or more files or databases. The system may communicate with a worker's smart phone. The user may be able to open, edit delete, review or manage all automatically created event records. The system may use information in the text, email, calendar, to automatically create a time tracking record for the user. In addition, the system may automatically convert emails, texts, meetings on a calendar to a time tracking event by means of a pop up box to the user.

WPO 2008/061146 filed by Neveu Holdings, LLC discloses a system and method for remote time collection for employee time on job sites. The system can collect an employee's name, picture, title, contact information, health and/or safety information, skill information, etc. The system can also collect for each employee a project name, project identification, location, project start date, project supervisor and detailed comments about project activity. The system can also collect information on vendors, such as name, address, phone, contacts and type of vendor. The system can also use GPS information and compare it with when the employee is supposed to work. The system collects biometric information to identify an employee. In one embodiment, a time collection database is configured to receive, process and store information related to projects such as name, identification, location start date, supervisor, etc; vendor's name, address, number contact, subcontractor type, etc. project supervisors, tasks, employee titles, departments and employee time records. Office data collection may include: job site, task and project information via a wireless connection. Encryption is used to transmit data to and from the remote site. The system may also include a field scheduling module to schedule a job for a particular jobsite and for a specific remote user(s). The user can edit hours and view comments from remote workers. Remote monitoring can record task completion, view management comments and ask for management assistance and crew responsibilities.

U.S. Patent Disclosure No. 2015/0081381 filed by Okoba discloses a system and method for recording time which may be used on a device, software or application. It may be used by logging into a plugin or extension. The time recorded may be exchanged for vouchers which may be redeemed or traded with other members. A user will register with an ID and password to log into the system. The system may record device activity, software activity, application activity, keyboard activity and mouse activity. The user's time spent in the browser or on a video game may be given a redeemable value. A database may store the recorded activity for further analysis. The system will work on computers, tablets, cell phones, television, games, digital books, exercise apparatus, web browsers, mobile apps and video games. Vouchers may represent monetary value, promotions, products or services. User name and password may be stored in system cookies. The system can capture video game or browser activities, keyboard or mobile keyboard activities. The activity spent in the system may translate to purchasing power so that the user may receive optimized value from their activities and the system may deliver purchasing incentives at the right time and place and for the right product or service. A business may be selected as a favorite from user activity on the system.

U.S. Patent Disclosure No. 2015/0081487 filed by Porter, et al., discloses the use of a time tracking and productivity system including a tracking component to locate an employee to record time spent at various locations. This system is designed to monitor and improve coordination of patient care, and in particular, to limit the number of patient hours a resident physician can work per week. When the rules implemented by the ACGME are violated, strict fines and probations or suspension may be implemented. This system is primarily concerned with tracking an employee's location and work hours. This system can include cloud performance. It is the movement of an employee within predetermined boundaries that will trigger the recording of a new event. It can track time in a patient's room, a brake area, doing paperwork, etc. A GUI is used on handheld devices. The system can also use tags that interact with RF signals. The system records employee info and FRIDA numbers, the resident program director, the resident coordinator, start and end times for resident shifts, house calls, in house calls, night float, etc. If moonlighting is permitted, the system can track moonlighting hours as well. It will store vacation schedules and rotation schedules. The shift log can include a short trip buffer. Automatic warnings of over limit hours are sent to management for the residents via text, phone, email, etc.

U.S. Pat. No. 6,185,514 issued to Skinner discloses a method and system for automatically collecting and analyzing information regarding time and work performed on a computer. It uses a data collector for monitoring certain portions of a worker's computer activity and an analyzer for showing which portions of the activity were continuous work activities, and the system will categorize the work into preset projects and tasks within a project. The information is periodically written to data storage. The system is directed toward telecommuters. The system automatically excludes time where there was no activity on a computer. The system is used to forecast future projects with reduced financial risk. The system includes the automatic documentation of time. The data stored on the system is encrypted so that it cannot be altered by the user. The data collector automatically collects the activity on a mouse and on the keyboard of the computer user. The system creates a log file of work activity. A hardware abstraction layer can interface with phones and other devices and can be used with pointing devices such as a tabled or mouse. The system keeps track of activities within open multiple windows on a computer.

U.S. Pat. No. 8,209,243 issued to Smith, et al., discloses the use of a system for performing real time labor management and timesheet reporting which is adapted to wirelessly transmit timesheet information. The portable devices may be dedicated to tracking time only and cannot perform other computing functions. The system includes a portable electronic punch system that is capable of communicating with the labor management system via text. The system allows user to manage work schedules and report timesheet information without requiring an internet accessible computer. The units send timesheet information directly back to the server for analysis via wireless network. The text messages may contain: employee ID, clock in time, clock out time, break times, days worked, days off and other work related information. New user information may be set up by text message into the timekeeping system. The system may operate over any wireless system, i.e., GSM, GPRS, CDCP, Bluetooth, Wifi, etc.

U.S. Pat. No. 9,020,848 issued to Ridge, et al., discloses the use of a method for tracking time and location of an employee according to a predefined schedule and it may utilize software to track the presence or non presence of: a NFC (near field communication), BLE (Bluetooth Low Energy) or other wireless device. The system will track the presence of an employee in a geofenced area. It will also track employee time and other data to log that into a payroll system. The low energy device then communicates data to a server if a signal could or could not be detected. It will also allow for manual clocking in and out in case of failure of the back end server. The system can also be used for security purposes. The system can function in real time or in batch request mode. The information may be a time stamp, a status or location of a mobile device. In one embodiment, the system can be used for employees for a retail store or restaurant. The system can utilize Bluetooth tapping to log in. It may be used at a trade fair both by tapping the device to a NFC communicator. It may be used in connection with a mobile time clock app. It can be used to advise management when non authorized employees enter a restricted work zone. Management may input which work zones are restricted and which are not.

WPO Disclosure 2015/029073 file by Shirish discloses a system and method to measure aggregate and analyze time, effort and productivity by reviewing time spent on activities such as calls, travel, lab work, meetings, discussions and remote visits. PD's or Presence Devices may be used to track employee location. The system can track average daily work patterns. It can track work activities and private activities. It can track emails and browsing. It can account for flexible work hours, use of multiple and different types of computing environments (PC at work and home, smartphones, tablets, etc.) It can capture files, folders, web links, etc. It can make all personal endeavors password protected and private. It is intended to track effort and performance 24/7. It can provide modules that promote work focus and minimize distraction by awarding performance points, badges for consistent performance and progress in performance goals. It can measure improvement by creating an n-dimensional effort data cube and include analytics for custom reports. The system can go into self improvement mode to set goals for self improvement and activities related thereto. It can be used at work whenever and where ever. It has a time tracker for all online time. It has a Merger to merge offline and online time effort mapping. It has an interference engine to determine Work Patterns for employees, leave taken, work done on holidays, desk or supervisory or travel oriented job, etc. The System will also present organization goals and analytics, top performers, work patterns, recent deviations from work patterns. A Collector module measures data to improve the exact work effort at the individual level throughout the day. The System can be used on SAS (Software as a Service) and it may be hosted in a cloud-computing environment.

U.S. Pat. No. 2012/0173297 A1 disclosed by Styn, et al., a method and system for task tracking and allocation is disclosed. The disclosure provides for a method in which an individual may create a set of instructions operable to perform a set of tasks in a computer readable medium. That set of tasks may comprise maintaining a database, generating a first interface displaying subjects associated with individual issues, and a second interface with notes specific to an issue selected by a user. The instructions stored in the database may be implemented accordingly and the computer may maintain a plurality of relationship records containing data indicating relationships across folders. The disclosure also mentions the prior use of MS Project and ERP systems that employ Gantt charts, milestones and tasks and subtasks with complex dependencies. This system keeps track of billable items. However, Van Styn is not a true timekeeping and professional billing system.

US Pat. No. 2014/0108644 A1 disclosed by Zaents, et al., a method and system for tracking time in a web-based environment is disclosed. The method of tracking time involves a web-based application to track time associated with several records. Identifying a record in an active state, generating a record associated with the active record and activating a timer, and having the ability to end the session in response to an indication that the record is an inactive state. The time-tracker may be hosted in a cloud-computing environment. The time-tracker may calculate the entire duration of the record by continuously adding the active times together. The method may detect a predetermined total duration of time has been exceeded and provide such indication to user. This disclosure mentions timekeeping, billing and using a web browser and multiple tabs to record time for multiple clients when a professional is switching back and forth between projects. It is useful for billing, accounting and auditing. More than one user can log into the system on a computer and track time her or his time on the same computer. It also teaches the use of sub-tabs to track time. A stop watch type button is used to switch on and off the time tracking, or time is tracked as the user switches browser windows.

However, none of the above patent disclosures teach or suggest improved billing and timekeeping systems which are able to directly edit work-in-progress sheets, draft and final bills and automatically have those changes reflected in the original work data entries. There are also no timekeeping and billing systems seen in the marketplace that can automatically predict cash flow, partner profits and allow clients to view bills in real time. These and other additional objects and advantages are readily derived from the disclosures and drawings provided herein.

SUMMARY OF THE INVENTION

The present invention consists of Improved Systems and Methods for the handling of Vendor accounts and goods and services received from Vendors and paid for by a firm, as well as automated and computerized systems for meeting the statutory requirements of a variety of jurisdictions to pay VAT taxes, state, local and regional taxes and to enter accounting journal entries which can be shared in real time or near real time with satellite company in interstate and intrastate commerce, as well as globally and regionally.

In one preferred embodiment of the present invention, Improved Vendor Online Order and Tracking System, three way matching is used from the initial ordering function, to the invoice function all the way through the receipt of goods and services function. Upon receipt, all of the persons involved in each transaction will be able to log into the company's proprietary system and rate the good and services and price and quality such that in house vendors that do not perform appropriately are terminated or avoided.

In this particular system, the User of the System, typically an employee or professional, will log into their private online account and make a Request for Proposal from the System. In some instances coding will be provided so that the User can choose from a variety of pre-approved vendors, goods and services and costs and quantities which the User is allowed to purchase based upon the User's name or employee level or rank. For example, the Partners and Managing Partner and Staff and Human Resource Director may have unlimited purchasing power, subject only to daily or weekly reporting to all Partners. Partner may have limits up to their equity in the Firm. Non-equity partners may be limited to their monthly salary, as are other Associates. Staff will always need a sign off from Partners and Management for all expenditures. In some cases, major expenditures must be approved by a Board of Directors or other company team and the system will automatically select these individuals for order approval before the order is sent out to a third party Vendor.

To initiate the system, an employee will be provided with an online account having a subroutine dedicated to purchases of $3^{rd}$ party services and supplies. Examples of such purchases would include, copier servicing, copier paper and toner, staplers, legal pads, toner cartridges for printers, rubber bands, staplers and rulers. When the User of the system desires to make a purchase of Office Supplies, he will click on a button on his online account for "Online Purchases of Office Supplies", from there he will see a list of approved vendors, pricing and estimated dates for delivery to select from. Once the Vendor is selected, the employee will then input the quantity and an invoice will automatically be transmitted to the Vendor via text, fax or email. The Vendor will respond and confirm the delivery date, which will then be entered into the improved Vendor Online Order Tracking System by the employee.

Once the goods and services are received, then the Vendor will be rated by the delivery for the quality of the goods, the price, the quickness of delivery, the packaging and any other criteria important to the user of the equipment.

When the next employee places an order with this Vendor, she or he will be able to review the prior purchaser's ratings and reviews prior to ordering again with the same Vendor. If no ratings or reviews have ever been collected from the company's prior orders, then the system will automatically download review data from Yipit, Yelp, Google or Ebay or other online ratings system. If the Vendor consistently gets low ratings, the Vendor will be banned from the System until online ratings improve.

Automatic notices can also be sent to the employee to make reorders at regular intervals so that stock and supplies do not run out at crucial work periods. In such a manner, common items such as copier paper, pens, pencils, pads of paper, copier and printer toner, will not run out.

The invoice, after being submitted, will then be turned over to the Purchasing Department for review where payment will take place, preferably electronically. The System will automatically store the Vendor's preferred forms of payment, typically by check, credit card, ACH transfer, Chase QuickPay, Paypal, Bitcoin, or other preferred payment method. When the product arrives or the services have been performed, the System will ask the employee who received the goods and services and used them to rate them. These ratings may be shared with the Vendor as well as with the public online.

In the present inventive Improved Vendor Online Order and Tracking System, purchases can be made for a plurality of Offices, Employees and Clients. The Improved Vendor Online Order and Tracking System will be able to upload Purchase Orders in a wide variety of formats, including Excel and Quattro Pro, Word and Wordperfect and Open Office formats and .csv files. The System will also be able to capture Approver details where a third party must approve a deal previously made, and especially in instances where one or more clients are involved in paying for the purchase. The System will be able to generate reports by payment method, house bank, due date, aging, Open Items by Vendor. The System will also link to and utilize third party purchase order systems. The System will also interface with third party Taxi Expense systems. The System will also be able to transfer Hard and Soft costs between Matters, Clients, Client Groups, Tasks, Activities and Phases. The System will also automatically handle returns, rejection letters for goods with the appropriate reason, and will be able to store RMA's and print out a return label to the Vendor's specifications.

If a due date for goods and services has been set by the System and a review has not been entered by the User for receipt of the goods and services, the System will start to automatically ping the employee to determine if the goods have arrived, and if not, the System will ask the Employee about cancelling the order and obtaining a refund, or if the Employee desires to continue on with the order and continue waiting for arrival of the Goods ordered.

The System will also provide automatic Invoice Verification. When the Goods arrive, scanners will be provided to accept QRT squares or UPC codes with the invoice number to ensure goods are checked into the System at the time of delivery. Once the receipt of goods has been entered into the system, then the Employee requesting the goods/services will be pinged for a review in a day or two. Any Variance noticed on the invoice (Quantity, Quality or Price) is captured as a purchase Variance during Invoice Verification in the System.

The System will also be able to charge an Invoice or Expense to a Partner, line by line. The System can make the select House Bank information (for payment) available on every invoice, or it can block some or all invoices from House Bank invoice payment. The System can block "of counsel" partners from the purchase order and invoicing System unless and until the order is prepaid. The System can block any employee ID from accessing, or ordering from the Vendor Online Order and Tracking System.

Reports can be generated by: local office, regional office, national office or Global office. Any expenses and invoices are standard and can be transmitted between offices and the system will automatically assign an exchange rate to transfer any invoices between offices either those that are in the A/R stage or those which have already been paid and marked as a Business Expense to the Company or Local Office for tax purposes. The System will be able to export or import large amounts of invoices quickly and efficiently between any working office or the Corporate or Global Headquarters. These invoices can be charged to any employee, but especially a partner, or a cost center. The invoice will be able to show a Responsible Party on the Invoice for Tax and Statutory purposes. Invoices can be scanned, faxed, texted or emailed directly into the System for upload and approval. Invoices will be associated with the screen providing online User information and will be associated with a Purchase Order number.

The typical Invoice Data entered into the System for an Invoice or Purchase consists of the following: Company ID, Vendor ID, Document Date, Terms of Payment, Payment Method, Tax, Amount (Posted to both General Ledger and Expense Ledger), No. of Items, Item Description, UPC, Unit of Measure, Amount per Item and Detailed Description or Narrative. The amount paid can be allocated to one or m ore of the following Categories; a Task, an Activity, a Matter, a Client, a Client Group and a Phase. The amount paid may be posted against one or more of the following ledgers: a general ledger, a cash ledger and a sub ledger. Taxes may be allocated to one or more of the following ledgers: a general ledger, a cash ledger, a sub ledger and a tax ledger for reporting to the Authirities. The System can also provide a Payment Block for when the Amount and Quantity of items ordered have arrived and there is a Variance in Amount, Quantity or Quality actually received, then the System will flag the invoice and the Purchasing Manager will investigate and ask for an appropriate adjustment to price or refund regarding items listed on the Purchase Order.

Of counsel attorneys, are treated the same as other third party vendors and their bills are not paid unless and until payment is received from a Client.

Once an invoice or a Request is scanned into the system, that invoice will always be associated with the line items for the Purchase Order in the System. If the narrative is longer than one line, the User of the system will have the option to display additional lines, as necessary. The System will have the ability to print and reprint checks upon demand, complete with encoded signatures of the appropriate check signatories. The System will have the ability to cancel and void checks. The system will be able to produce payment advices or notices when payment will be made and under what terms and conditions. The System will be able to transmit payment via intermediary banks. The System will be able to pay a Client's costs or expenses on behalf of another office. The System will be able to transmit Positive Pay files to a Bank or other Financial Institution.

The system will be able to post a Journal Entry (Income or Expense) in any desired currency, with or without a currency override. Journal entries may be posted in managed or non managed accounts, to a direct account with or without a Personnel number, and it can be posted across multiple Profit or Cost Centers with or without an 510. A Cost Center is one such as Research and Development where costs are generally not recovered except over a long period of time and which are generally not assignable to a particular Task, Matter, Client or Activity. A SIO or Statistical Internal Order is a Cost Center where costs may be spread out of several items. These are ERP and SAP terms. Cash receipts are posted directly to the General Ledger.

In SAP or ERP, a ledger is a section of a database table. A ledger only contains those dimensions of the totals table that the ledger is based on and that are required for reporting. In General Ledger Accounting, the User may utilize several ledgers in parallel. This allows the User to produce financial statements according to different accounting principles, for example GAP (Generally Accepted Accounting Principles), FIT (Financial Income Tax), accrual or cash. The User may create a ledger for each of the general ledgers needed. A ledger uses several dimensions from the totals table it is based on. Each dimension of the totals table represents a subset of the coding block. The User may also include customer fields in all the ledgers. To do this, the User must add the customer field to the coding block and then include this field in the totals table that the ledger is based on. It is the User who defines the ledgers in Customizing for Financial Accounting (New) under Financial Accounting Global Settings (New) Ledgers. Upon the creation of a ledger, the system automatically creates a ledger group with the same name. The User must then designate one ledger as the leading ledger for a SAP/ERP system to work.

In the present invention, items can be posted to Personnel numbers, and Management Allocations can be posted across Company Codes over up to two years. Allocations can be tracked from other systems and also by Title, employee ID or employee level. Expenses can be tracked by Client groups for profitability analysis and ROI calculations. The BV Service Fee can be posted on management books. Intercompany expenses can be posted on the paying Office's books, and then transferred later to the appropriate Company Code. Journal entries can be parked or held prior to posting.

It should be observed that there are numerous configurations, options, additions and rearrangements of elements found in the prior art which are considered obvious to try and which should be considered as part of the summary of the present invention as if fully set forth herein.

OBJECTS OF THE INVENTION

Thus, it is one primary object of the present invention to provide an improved system and method for Vendor management which is able to create a request for goods and services from third party vendors such that a company employee can access the improved System, search the system for goods and services which are needed, find the best quality goods and services for a historical price, ping the Vendor for a current price, and place an order by phone, fax, email or text.

It is an additional primary object of the present invention to provide an improved system and method for Vendor management for creating a request for goods and services from third party vendors searching through the Company directory of vendors, accessing a QRT code or UPC code for a preferred product or service with an optimal price and then pinging the Vendor for a current price.

It is a further primary object of the present invention to provide an improved system and method for Vendor management for scanning in or texting a photo of a Bill of Lading so that the System can automatically identify variances in price, quality or quantity and place a block on the order to rectify the situation via the appropriate contract purchase personnel.

It is yet an additional primary object of the present invention to provide an improved system and method for Vendor management for requiring employees to rate the value of goods and services received promptly after receipt so that other divisions and company locations are alerted if such value is not acceptable for company purchases in the future, if such goods and services are highly rated.

It is still a further primary object of the present invention to provide an improved system and method for Vendor management wherein if an statistically reliable employee ratings system is not available, then the employee requesting goods and services may have the System search the internet for ratings on goods and services from third party purveyors such as: Yelp, Yipit, Google, Ebay, Amazon and the like for further information.

It is yet an additional primary object of the present invention to provide an improved system and method for Vendor management wherein an employee in need of third party goods and services may log into his or her company account and request goods and services and see the highest rated purveyors at the most optimal prices and review the ratings, products and delivery times to meet the needs of the employee and/or client in need of such goods and services.

It is still a further primary object of the present invention to provide an improved system and method for Vendor Management where in the System will analyze vendor rating online and by employees and then ban any Vendors where ratings are deemed unacceptably low.

It is still a further primary object primary object of the present invention to provide an improved system and method for Vendor management wherein a third party approval is built into the system, such that after an employee selects a vendor based upon favorable pricing, the optimal price and the selection is sent to the third party via fax or email or password protected website for the necessary approvals.

It is yet an additional primary object primary object of the present invention to provide an improved system and method for Vendor management wherein Vendor expenses can be allocated to one or more of the following accounting categories: Matter, Client, Client Group, Task, Activity, Phase or Matter.

It is still yet a primary object of the present invention primary object of the present invention to provide an improved system and method for Vendor management wherein at the time goods are received, the Bill of Lading may be scanned or texted via photo into the System and the System may automatically cross reference and check for correct quantities and costs at the point of delivery, and where variances occur, those are flagged to each of the System, the provost, the employee and the Vendor so that variances can be quickly and efficiently dealt with and resolved, so that if payment is remaining, it can efficiently be made.

These and other objects and advantages of the present invention can be readily derived from the following detailed description of the drawings taken in conjunction with the accompanying drawings present herein and should be considered as within the overall scope of the invention.

DETAILED DESCRIPTION OF THE DRAWINGS

Figure 1:
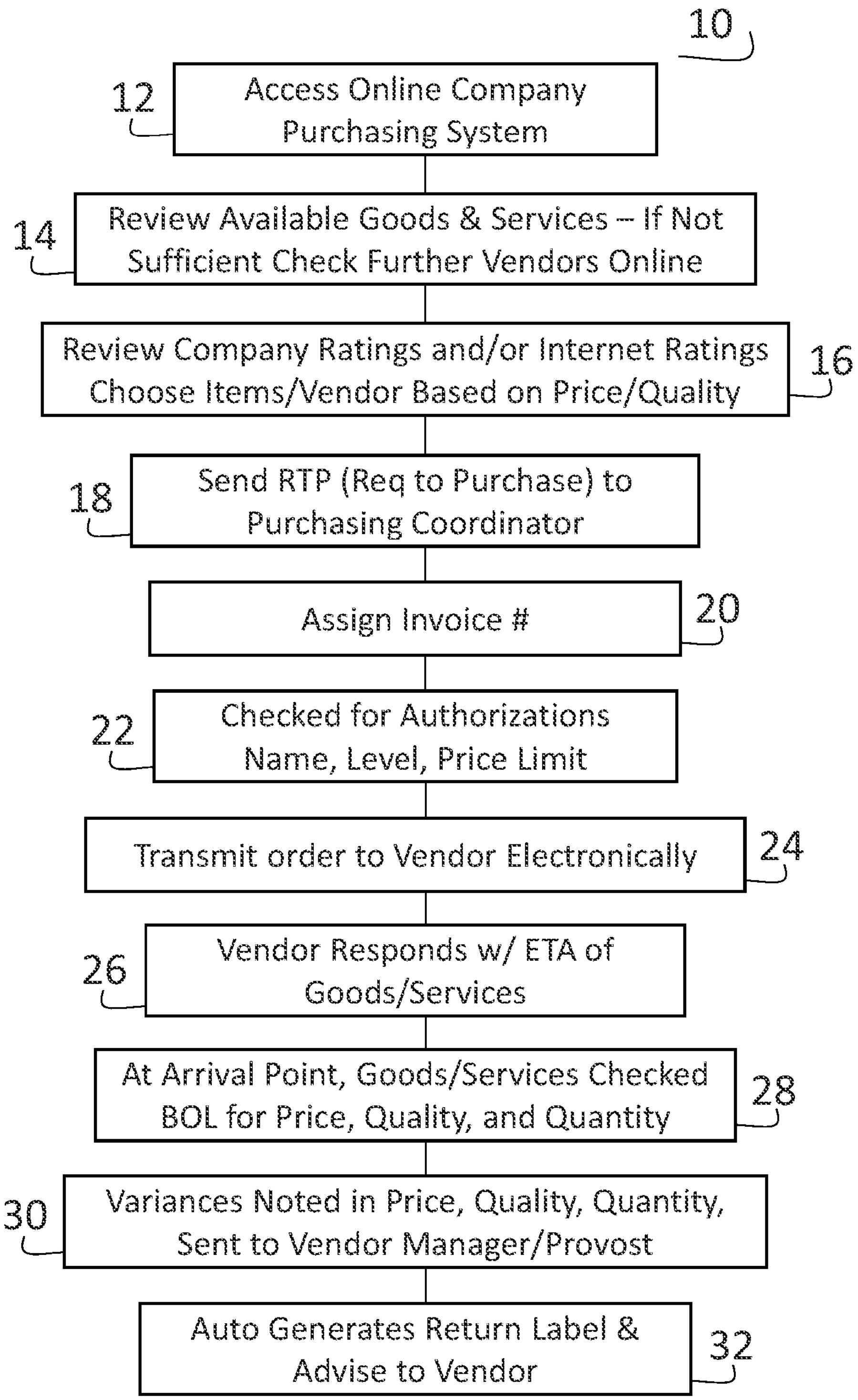
FIG. 1 is a flow chart of the present inventive method, Improved Vendor Online Order and Tracking System.

Shown now in FIG. 1 is a flow chart of one preferred embodiment of the present invention, Preferred Vendor Online Order and Tracking System 10 showing the first step is to access the online company purchasing system 12 when an employee desires to make a purchase on behalf of the Company or Client. Next the User of the System will review the available goods and services already present in the system 14. If what is existing in the System is not sufficient to meet the needs of the User and there are no pre approved or formerly utilized Vendors or Goods and Services previously ordered from the Vendors in the system, the User of the System will be able to look online for further Vendors with the desired Goods and Services, or even in local stores. At this point the Employee can input a new Goods or Service into the System and may even scan any QRT or UPC codes into the System.

Next, the User will be able to check the best price for all comparable goods and services in that category, either in the existing System or in Online web sites, including, but not limited to: Ebay, Amazon, Office Max, Office Depot, local stationers, etc. and the System will automatically display and all reviews which it has found for that product or service category. The System will also automatically display a calculator and the price per unit, if it can be located. The System will also be able to make a listing of items to be compared and can list them from low to high including shipping, so that the User can find goods or services at optimal prices for the company.

Next, the User will select the Goods and Services desired for that Vendor 16, the Vendor's name, address, email, fax, terms and conditions for payment will be entered into a Request to Purchase to the Purchasing Department for Approval 18, if the System does not already contain the information. The Purchasing Department will then assign an invoice number to the request 20, analyze it and either approve or deny the request, notification of approval or rejection will be sent back to the employee or User in electronic format. The Purchasing Department may hold the invoice to ask for further details or overrides from the employee's supervisor who may have greater power to approve purchases. The Purchasing Department will check the Requestor's name, title and level to determine what, if any limits the Requestor has for spending at the company 22. In addition, if the Requestor's purchases have further approvals, the invoice will then be transmitted to the other Employees for their approval of the invoice, as well.

Once the Invoice has been approved, then the order will be transmitted to the Vendor by fax, email or other form of electronic transmission. The System also has the capability to store Vendor templates and issue Purchase Orders in the form or format required by the Vendor. All Employees at the Company are treated as Vendors as well, as well as Clients. Of counsel employees are further treated as third party vendors.

Once the Vendor has approved the Purchase Order, the Vendor company will respond with an ETA or Estimated Delivery Time for the Order 26 and the System will automatically docket this date and send the invoice to the Accounts Payable department for payment. Once the goods and services have arrived at the company, the Bill of Lading will be checked for price, quantity and quality of the goods, and the goods themselves will be inspected as well for any variances 28, which variances will immediately be noted on the Bill of Lading which is then texted or scanned and emailed to the Purchasing Dept. for further processing. If a variance of any kind is noted—price, quantity or quality, then the entire invoice and Bill of Lading is flagged so that the Purchasing Manager will become directly involved 30 to resolve any discrepancies, correct payments, request refunds, obtain any RMA's from the Vendor (Return Merchandise Authorizations), and a Return Label may be automatically printed by the System 32 as well as any communication explaining the return or credit desired, and a pick up arranged by a major carrier—USPS, UPS, Fed. Exp. such that the goods are returned in an expedient manner.

Figure 2:
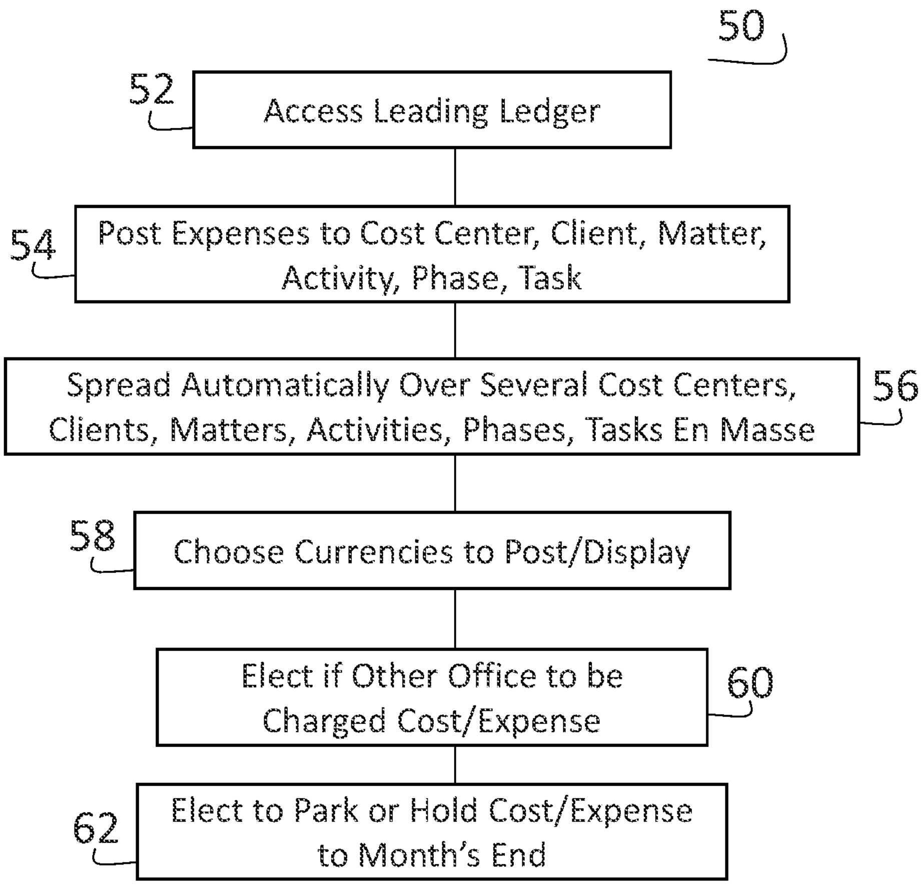
FIG. 2 is a flow chart of the present inventive method, Improved Journal Entry Posting and Tracking System.

FIG. 2 shows an Improved Method for Entering and Posting Journal Entries 50 wherein the first step is access the Leading Ledger and related Ledgers 52, then expenses and costs may be posted to any of the following: a Cost Center, Client, Matter, Activity, Phase or Task 54. If the User desires, the new journal entry or posting can be split across multiple Cost Centers, Clients, Matters, Activities, Phases or Tasks 56 en mass, by selecting the multiple categories and assigning a percentage for each. For example, the Client can select 4 Clients or Cost Centers and assign each 25% of the total expenditure or cost. The System will also allow the User to select multiple currencies to display on Reports, and the System can either use a pre set exchange rate, or the System can be asked to ping one or more web sites for an updated exchange and take the average of these, or the User can manually override the System and enter in the User's desired exchange rate 58.

In addition, the User may elect if a Client from a different Office will be billed for the Expenditures and the cost or expense will automatically transfer to that Office to post in due course 60. A further feature of the present invention is that it will allow the user to "park" or place on hold a variety of expenses until the accounting is closed out at the end of the month 62. This is helpful in preparing interim accounting reports where certain expenses may distort the figures during a middle of the month run.

Figure 3:
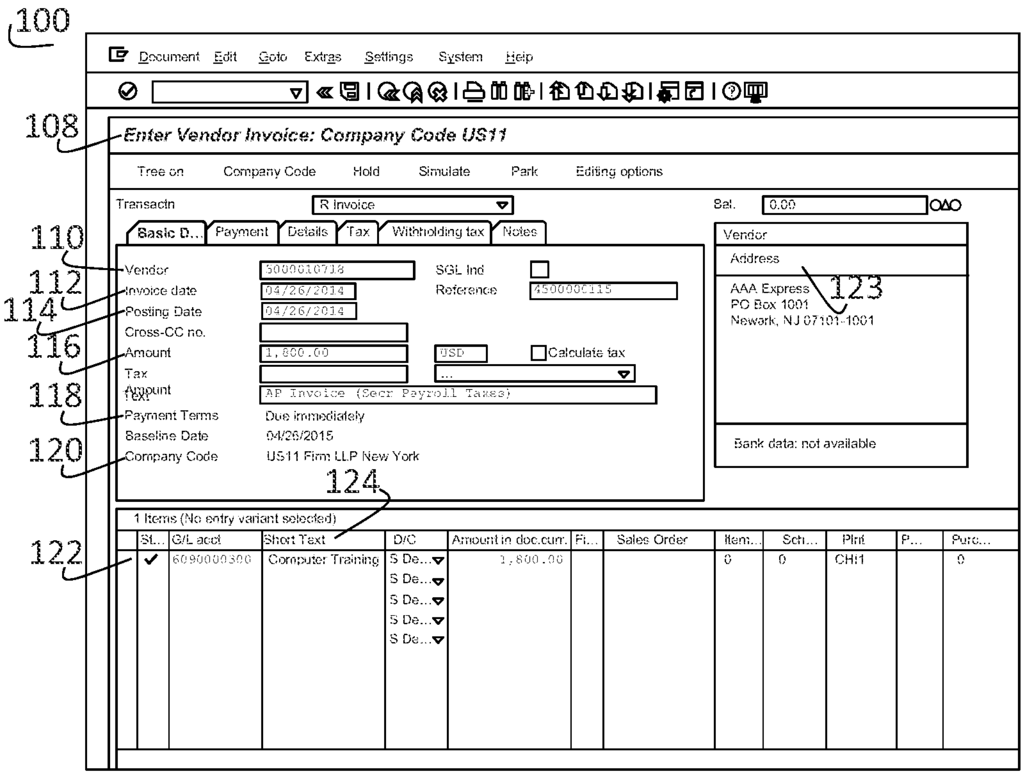
FIG. 3 is a screen snap shot of one embodiment of the present invention, Improved Expense Posting System.

FIG. 3 shows a screen shot of Improved Expense Posting System 100 for a preferred embodiment of the improved process for entering a Vendor Invoice into a General Ledger account for the company or firm. This Figure shows the Header: Enter Vendor Invoice 108, Vendor ID field 110, Invoice Date 112, Posting Date 114, Amount 116, Payment Terms 118, Company Code or ID 120, Item Paid Listing 122, Vendor Address 123 and Short Text or Description 124. The user will double click on the GL Account: 6090000300, and then enter the cost center and office as shown in FIG. 4.

Figure 4:
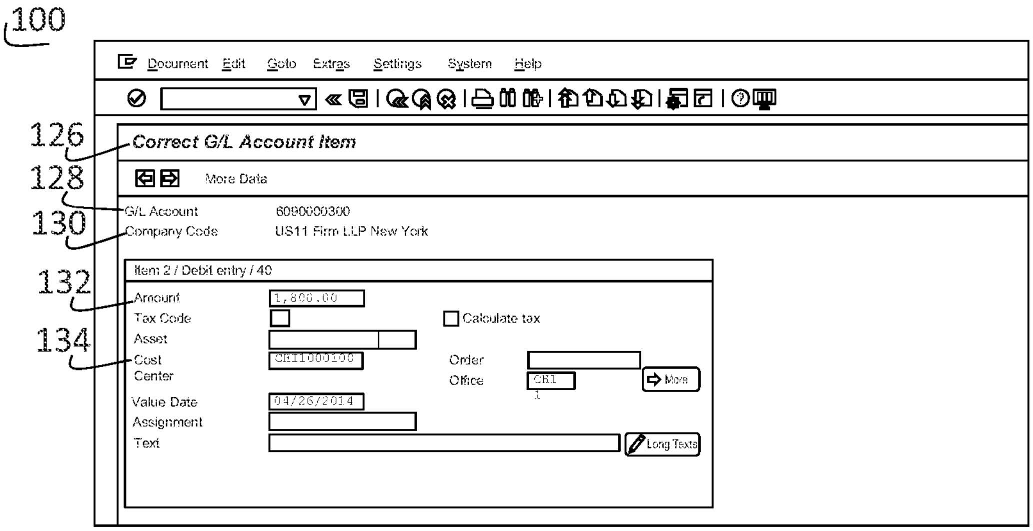
FIG. 4 is a screen snap shot of one embodiment of the present invention, Improved Expense Posting System.

FIG. 4 shows a screen shot of Improved Expense Posting System 100 for a preferred embodiment of the improved process for entering a Vendor Invoice into a General Ledger account for the company or firm. This Figure shows Header: Correct G/L account item 126, General Ledger Account Field 128, Company ID 130, Amount 132, and the Cost Center 134 for the charge to be allocated to. The user will press enter and then press the green go back arrow to go back to the initial screen and then click the payment tab to enter the house bank as shown in FIG. 5.

Figure 5:
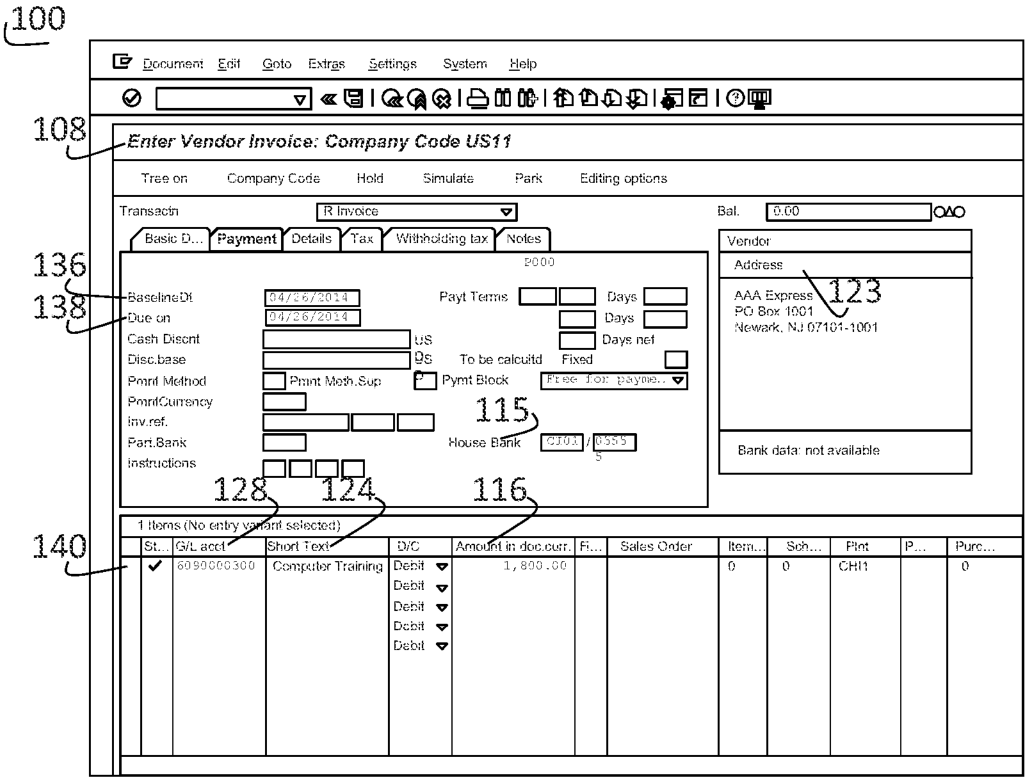
FIG. 5 is a screen snap shot of one embodiment of the present invention, Improved Expense Posting System.

FIG. 5 shows a screen shot of Improved Expense Posting System 100 for a preferred embodiment of the improved process for entering a Vendor Invoice into a General Ledger account for the company or firm. This Figure shows Header: Enter Vendor Invoice 108, Vendor Address 123, Baseline Date 136, Due Date 138, a Listing of Items 140 showing then General Ledger account 128 for each item listed, the Short Text or Description 124 for each item, and the Amount 116 of the charge in the document currency. The House Bank information 115. In the US, this is the routing number and account number; in other countries this will include a Swift Code and routing number. The user will click on the Save button to post the hard cost invoice, and then will review the posted document for accuracy.

Figure 6:
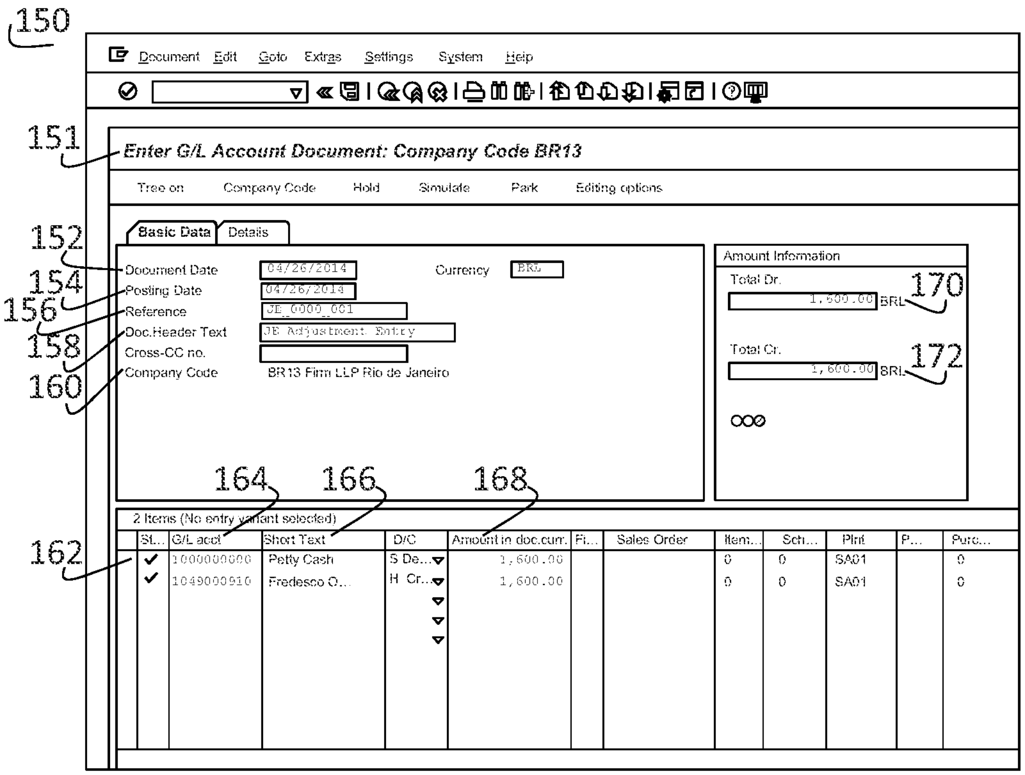
FIG. 6 is a screen snap shot of one embodiment of the present invention, Improved Expense Posting System.

FIG. 6 shows a screen shot of Improved Expense Posting System 150 for a preferred embodiment of the improved process for entering a Vendor Invoice into a General Ledger account for the company or firm. This Figure shows Header: Enter G/L account Document: Company Code X 151, the Document Date 152, the Posting Date 154, the Reference 156, the Document Header Text 158, the Company Code 160, the Header for the listing of Items 162, the General Ledger Account 164 each Item is charged to, and the Description or Short Text 166, the Amount of the charge 168, the Total Debit 170 or Total Credit 172 paid.

Journal entries can be processed either by posting into the leading ledger or by posting in a non leading ledger. Both processes are described in FIGS. 6 to 8. In FIG. 6, the user will double click on the GL Account 1000000000, then the user will click on the More button and enter the office code as shown in FIG. 7 in the coding block.

Figure 7:
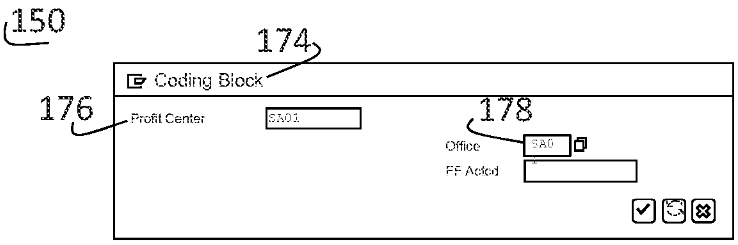
FIG. 7 is a screen snap shot of one embodiment of the present invention, Improved Expense Posting System.

FIG. 7 shows a screen shot of Improved Expense Posting System 150 for a preferred embodiment of the improved process for entering a Vendor Invoice into a General Ledger account for the company or firm showing Coding Block 174, Profit Center 176 and Office 178. The user will repeat the steps for another GL Account 1049000910 to enter the Office code and then hit enter to code the entry properly. The user will then hit the green go back arrow that appears next and the user will go back to the initial screen where the user can click on the Save button to post the journal entry and then review what was posted.

Figure 8:
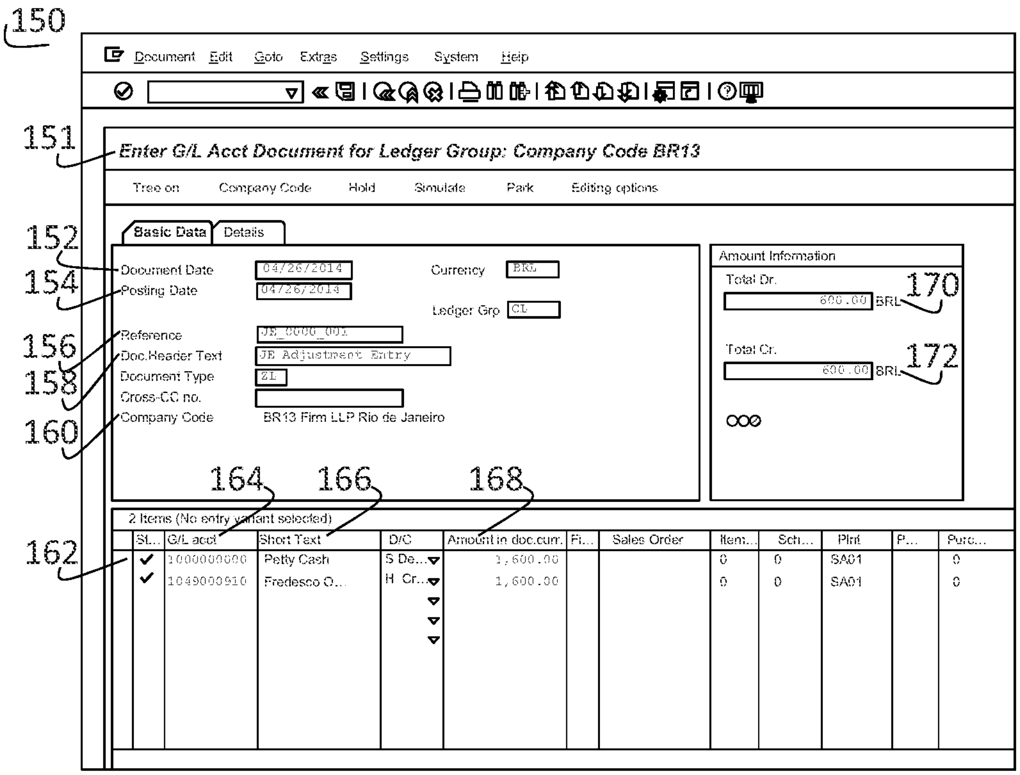
FIG. 8 is a screen snap shot of one embodiment of the present invention, Improved Expense Posting System.

FIG. 8 shows a screen shot of Improved Expense Posting System 150 for a preferred embodiment of the improved process for entering a Vendor Invoice into a General Ledger account for the company or firm showing Header: Enter G/L Acct Document for Ledger Group Company Code: x 151, the Document Date 152, the Posting Date 154, the Reference 156, the Document Header Text 158, the Company Code 160, the Header for the listing of Items 162, the General Ledger Account 164 each Item is charged to, and the Description or Short Text 166, the Amount of the charge 168, the Total Debit 170 or Total Credit 172 paid. The user can post a Journal Entry to a Cash Ledger (non leading ledger), but does so by entering document type 2 L and the Ledger Group CL to post an entry to a cash ledger. After the user has entered the data for this listing on the screen shown in FIG. 8, the user will double click on the GL Account 1000000000, and then click on the More button to enter the Office code as shown in the “Coding Block” of FIG. 7 and then the user will press the Enter key. Next, the user will press the green arrow goback button to go back to the original screen where the User can press the Save button and then review the Journal Entry saved.

Although in the foregoing detailed description the present invention has been described by reference to various specific embodiments, it is to be understood that modifications and alterations in the structure and arrangement of those embodiments other than those specifically set forth herein may be achieved by those skilled in the art and that such modifications and alterations are to be considered as within the overall scope of this invention.

What is claimed is:

1. A system of the type used to facilitate purchases by employees of a company, the system comprising a CPU and data storage configured to:

create, by the CPU, at least a first ledger and a second ledger that are each dimensioned based on a totals table;

designate, via the CPU, one of the first ledger and the second ledger as a leading ledger and the other of the first ledger and the second ledger as a related ledger;

present, via a user interface generated by the system, a user logon;

receive, via the user interface through the user logon, information indicative of a user;

automatically search with the CPU for ratings on goods or services of at least one vendor from a third party website;

access with the CPU the third party website and automatically download review data for the vendor;

determine, by the CPU, whether the vendor meets a standard for preapproved vendors based on the review data from the third party website, and when the vendor fails to meet the standard, automatically ban the vendor from being one of the preapproved vendors;

determine by the CPU, based on the information indicative of the user, a list of the pre-approved vendors and pre-selected items from which the user is capable of ordering;

present, via the user interface, a display of the pre-approved vendors and the pre-selected items;

receive, via the user interface, information indicative of a purchase request for two or more items by an employee of the company;

generate a first purchase order for the two or more items in a first format;

utilizing a single user interface screen on the user interface which accepts a document type entry, post a first entry for at least one of the two or more items in the leading ledger and a second entry for at least one of the two or more items in the related ledger based on the document type entry meeting a predetermined condition;

enable selection of an account number utilizing the single user interface screen;

enable subsequent display of a coding block for entry of an office code based on selection of the account number;

enable return to the single user interface screen upon entry of the office code and selection of an icon on the coding block;

provide, based on a predetermined set delivery time for the two or more items, an automatic message to the employee requesting verification of receipt of the two or more items;

receive from the employee, in response to the message, an indication that the two or more items have not yet been received;

provide, in response to the indication that the two or more items have not yet been received, a query to the employee whether to cancel the purchase request or continue waiting for the two or more items;

upon receipt of the two or more items, receive a scan or photo of a bill of lading in a second format, the bill of lading including at least one of price, quality or quantity of the two or more items;

using the purchase order in the first format and the bill of lading in the second format, automatically compare the purchase order and the bill of lading, identify a variance at least one of price, quality or quantity of the two or more items in the bill of lading compared to the purchase order for the two or more items, and output an alert or command for a return label upon identification of the variance;

print the return label for the two or more items upon output of the alert or command; and produce, by the CPU, utilizing the office code from the coding block, at least one financial statement based on the leading ledger and the related ledger.

2. The system of claim 1, the CPU and data storage further being configured to:

present, via the user interface, at least one product and service review associated with the pre-selected items.

3. The system of claim 2, the CPU and data storage further being configured to:

display, via the user interface, a product and service review obtained via an online search.

4. The system of claim 1, the CPU and data storage further being configured to:

receive an indication that the two or more items have been received;

generate a review form and electronically transfer the review form to one or more employees; and receive, responsive to the review form, rating information concerning the two or more items on at least their quality and attributes and then saving the rating information for future reference.

5. The system of claim 1, the CPU and data storage being further configured to:

automatically block the display of any vendor that has received too many low ratings.

6. The system of claim 1, wherein, when presenting the display of vendors, the CPU and data storage are further configured to determine the display of vendors based on a name, level or rank of the employee.

7. The system of claim 1, the CPU and data storage being further configured to:

generate the purchase request for the two or more items;

transmit the purchase request to a vendor; and receive, from the vendor, information indicative of the estimated delivery time for the two or more items.

8. A method facilitating interactions between employees of a company and a system of the type used for facilitating purchases made by the employees, the method comprising:

creating, by a CPU, at least a first ledger and a second ledger that are each dimensioned based on a totals table;

designating, via the CPU, one of the first ledger and the second ledger as a leading ledger and the other of the first ledger and the second ledger as a related ledger;

presenting, via a user interface generated by the system, a user logon;

receiving, via the user interface through the user logon, information indicative of a user;

automatically search with the CPU for ratings on goods or services of at least one vendor from a third party website;

accessing with the CPU the third party website and automatically downloading review data for the vendor;

determining, by the CPU, whether the vendor meets a standard for preapproved vendors based on the review data from the third party website, and when the vendor fails to meet the standard, automatically ban the vendor from being one of the preapproved vendors;

determining by the CPU, based on the information indicative of the user, a list of the pre-approved vendors and pre-selected items from which the user is capable of ordering;

displaying on the user interface the pre-approved vendors and pre-selected items;

receiving, by the system via the user interface, information indicative of a purchase request for two or more items by an employee of the company;

generating a first purchase order for the two or more items in a first format;

utilizing a single user interface screen which accepts a document type entry, posting a first entry for at least one of the two or more items in the leading ledger and a second entry for at least one of the two or more items in the related ledger based on the document type entry meeting a predetermined condition;

enabling selection of an account number utilizing the single user interface screen;

enabling subsequent display of a coding block for entry of an office code based on selection of the account number;

enabling return to the single user interface screen upon entry of the office code and selection of an icon on the coding block;

providing, by the system based on an estimated delivery time for the two or more items, an automatic message to the employee requesting verification of receipt of the two or more items;

receiving, by the system from the employee in response to the message, an indication that the two or more items have not yet been received;

providing, by the system in response to the indication that the two or more items have not yet been received, a query to the employee whether to cancel the purchase request or continue waiting for two or more items;

upon receipt of the two or more items, receiving a scan or photo of a bill of lading in a second format, the bill of lading including at least one of price, quality or quantity of the two or more items;

using the purchase order in the first format and the bill of lading in the second format, automatically comparing the purchase order and the bill of lading, identifying a variance at least one of price, quality or quantity of the two or more items in the bill of lading compared to the purchase order for the two or more items, and outputting an alert or command for a return label upon identification of the variance;

printing the return label for the two or more items upon output of the alert or command; and producing, by the CPU, utilizing the office code from the coding block, at least one financial statement based on the leading ledger and the related ledger.

9. The method according to claim 8 further comprising:

presenting, by the system via the user interface, at least one product and service review associated with the pre-selected items.

10. The method according to claim 9, wherein presenting product and service reviews further comprises displaying a product and service review obtained via an online search.

11. The method according to claim 8 further comprising:

receiving, by the system, an indication that the two or more items have been received;

generating, by the system, a review form and electronically transferring the review form to one or more employees; and receiving, by the system, responsive to the review form, rating information concerning the two or more items on at least their quality and attributes and then saving the rating information for future reference.

12. The method of claim 8, further comprising:

automatically blocking, by the system, the display of any vendor that has received too many low ratings.

13. The method of claim 8, further comprising:

generating, by the system, the purchase request for the two or more items;

transmitting, by the system, the purchase request to a vendor; and receiving, by the system from the vendor, information indicative of the estimated delivery time for the two or more items.

14. The method of claim 8, wherein, presenting the display of vendors further comprises determining the display of vendors based on a name, level or rank of the employee.

* * * * *